United States Patent
Li et al.

(10) Patent No.: US 9,414,267 B2
(45) Date of Patent: Aug. 9, 2016

(54) TRANSMISSION METHOD AND DEVICE IN WIRELESS LOCAL AREA NETWORK

(75) Inventors: Nan Li, Shenzhen (CN); Kaiying Lv, Shenzhen (CN); Bo Sun, Shenzhen (CN); Feng Li, Shenzhen (CN)

(73) Assignee: ZTE CORPORATION (CN)

(*) Notice: Subject to any disclaimer, the term of this patent is extended or adjusted under 35 U.S.C. 154(b) by 484 days.

(21) Appl. No.: 13/883,417

(22) PCT Filed: Jul. 26, 2011

(86) PCT No.: PCT/CN2011/077637
§ 371 (c)(1),
(2), (4) Date: Jun. 12, 2013

(87) PCT Pub. No.: WO2012/058950
PCT Pub. Date: May 10, 2012

(65) Prior Publication Data
US 2013/0272288 A1    Oct. 17, 2013

(30) Foreign Application Priority Data
Nov. 4, 2010 (CN) .......................... 2010 1 0533052

(51) Int. Cl.
| | |
|---|---|
| H04W 28/26 | (2009.01) |
| H04L 5/00 | (2006.01) |
| H04L 25/02 | (2006.01) |
| H04W 24/00 | (2009.01) |
| H04W 84/12 | (2009.01) |
| H04L 27/00 | (2006.01) |

(52) U.S. Cl.
CPC ............. *H04W 28/26* (2013.01); *H04L 5/0053* (2013.01); *H04L 5/0091* (2013.01); *H04L 5/001* (2013.01); *H04L 5/006* (2013.01); *H04L 25/0204* (2013.01); *H04L 27/0006* (2013.01); *H04W 24/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2002/0071411 A1* | 6/2002 | Masui et al. ................... | 370/335 |
| 2005/0143081 A1* | 6/2005 | Stephens ........................ | 455/451 |
| 2005/0254513 A1* | 11/2005 | Cave et al. ...................... | 370/445 |
| 2008/0144498 A1* | 6/2008 | Chung et al. ................... | 370/231 |
| 2011/0222490 A1* | 9/2011 | Fischer et al. ................. | 370/329 |

FOREIGN PATENT DOCUMENTS

| | | |
|---|---|---|
| CN | 101102178 | 1/2008 |
| CN | 101208974 | 6/2008 |
| CN | 101582818 | 11/2009 |

OTHER PUBLICATIONS

International Search Report for International Patent Application No. PCT/CN2011/077637 mailed Nov. 3, 2011.

* cited by examiner

*Primary Examiner* — Jenee Williams
(74) *Attorney, Agent, or Firm* — McAndrews, Held & Malloy, Ltd.

(57) ABSTRACT

The disclosure claims a transmission method and device in WLAN, wherein the method includes: a transmitting STA or a receiving STA performing channel detection and/or channel scanning on a channel of the first channel set and/or the second channel set; if the result of the detection and/or scanning satisfies a preset condition, the transmitting STA and the receiving STA exchanging a reservation message on the channel of the first channel set or the second channel set, wherein the reservation message is configured to reserve a channel of the second channel set for transmission; the transmitting STA transmits a data frame to the receiving STA on the reserved channel of the second channel set; and after receiving the data frame, the receiving STA transmits acknowledgement information of the data frame on the channel of the first channel set or the second channel set.

16 Claims, 3 Drawing Sheets

TRANSMISSION METHOD AND DEVICE IN WIRELESS LOCAL AREA NETWORK

FIELD OF THE INVENTION

The disclosure relates to the field of communication, and in particular to a transmission method and a device in Wireless Local Area Network (WLAN).

BACKGROUND OF THE INVENTION

At present, in the field of wireless network, the WLAN has been rapidly developed. Demands for WLAN coverage are increasing. The Institute of Electrical and Electronics Engineers (IEEE) industry specification IEEE802.11 working team has defined a series of WLAN technical standards, such as 802.11a, 802.11b and 802.11g. Then, other task groups emerge, which are committed to developing the specifications for improving the existing 802.11 technology. For is example, the 802.11n task group puts forward the requirements of High Throughput (HT), for supporting the data rate which reaches up to 600 Mbps. As the evolution of 802.11n, the 802.11ac task group further puts forward the concept of Very High Throughput (VHT), and increases the data rate up to 1 Gbps. The new protocol needs to be backward compatible with the existing protocol.

In 802.11, a Basic Service Set (BSS) consists of an Access Point (AP) and a plurality of non-access Stations (STAs) associated with the AP. The 802.11 defines two operation modes: a Distributed Coordination Function (DCF) and a Point Coordination Function (PCF), and defines the improvements aiming at the two operation modes: an Enhanced Distributed Coordination Access (EDCA) function and a Hybrid Coordination Function Controlled Channel Access (HCCA) function.

Figure 1:
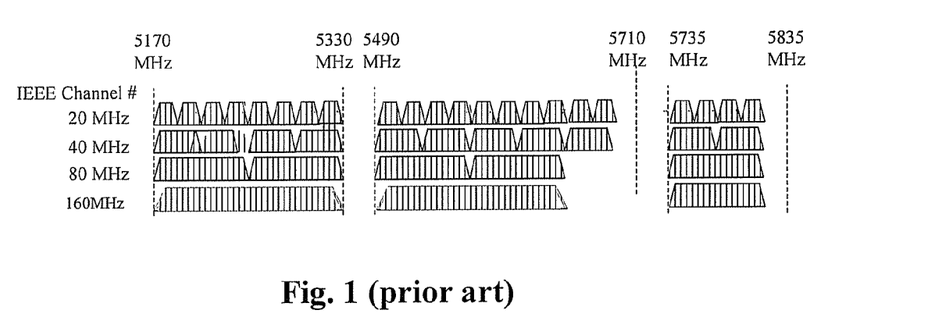
FIG. 1 shows a combination diagram of different channel bandwidths of a large bandwidth system according to the related art.
Figure 2:
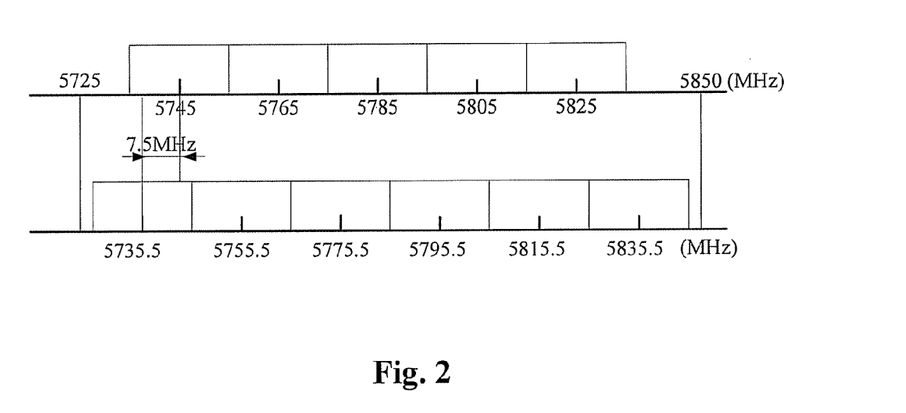
FIG. 2 shows a diagram of a channel set formed by different channelization methods in 5.725 GHz to 5.850 GHz frequency bands according to an embodiment of the disclosure.

The 802.11 protocol defines the concept of frequency planning class. Each frequency planning class has a sequence number which is corresponding to the operation rules of a group of wireless devices, such as the channel bandwidth, channel behavior restrictions, channel starting frequency points and channel sets. With the evolution of the 802.11 protocol, the traditional 20 MHz channel bandwidth has been expanded to be 40 MHz, 80 MHz, 120 MHz, and even 160 MHz. The large bandwidth is formed by binding a plurality of 20 MHz bandwidths. The 20 MHz channel is named as a basic channel here. When the bandwidth is a large bandwidth, one of the 20 MHz channels is named as a main channel or the first channel, and other 20 MHz channels are named as auxiliary channels or the second channel, the third channel, and the like. Thus, on the 5 GHz frequency spectrum, the large bandwidth is formed by a plurality of 20 MHz channels which are non-overlapping. According to the channelization method in the related art, the 160 MHz channel is composed of two 80 MHz channels which are adjacent or non-adjacent. Each 80 MHz channel is composed of two adjacent 40 MHz channels. Each 40 MHz channel is composed of two adjacent 20 MHz channels. The combination examples of the different bandwidth channels in the large bandwidth system are as shown in FIG. 1. In this case, there are two channelization methods in the frequency band between 5.725 GHz and 5.850 GHz. When the center frequency point starts from 5.745 GHz, and the frequency band is divided on the basis that each channel bandwidth is 20 MHz, there are five 20 MHx channels which are non-overlapping with each other in the frequency band, and the maximum channel bandwidth is 80 MHz. If each of the center frequency points shifts 7.5 MHz towards the direction of the low frequency point, six 20 MHz channels which are non-overlapping with each other can be generated in the frequency band, and the maximum channel bandwidth is 120 MHz. The diagram of the two channelization methods is as shown in FIG. 2. Hereinafter, the channel formed by the former channelization method is named as the first channel set, and the channel formed by the later channelization method is named as the second channel set.

According to the related art, in the frequency band between 5.725 GHz and 5.850 GHz, the 802.11n device is only operated on the first channel set, and the operation bandwidth is 20/40 MHz. The 802.11ac device which does not support the second channel set is only operated on the first channel set, and the operation bandwidth is 20/40/80 MHz. The 802.11ac device which supports the second channel set can be selectively operated on the first channel set or the second channel set. When operated on the second channel set, the operation bandwidth is 20/40/80/120 MHz.

However, the inventors find that in the related art, if one AP of the 802.11ac which supports the second channel set starts one BBS on the second channel set, then only the STA which supports the second channel set can scan the working frequency point of the AP and can be accessed. The STA of the 802.11ac and the STA of the 802.11n which do not support the second channel set cannot be accessed. Thus, it causes the problem that the 802.11ac system cannot be backward compatible.

SUMMARY OF THE INVENTION

The disclosure is provided aiming at the problems that part of the STAs cannot be accessed in the related art. Therefore, the main purpose of the disclosure is to provide a transmission method and device in WLAN, for solving at least one of the problems.

In order to achieve the purpose, according to one aspect, the disclosure provides a transmission method in WLAN, including: a transmitting STA or a receiving STA performing channel detection and/or channel scanning on a channel of a first channel set and/or a second channel set; if result of the detection and/or the scanning satisfies a preset condition, then the transmitting STA and the receiving STA exchanging a reservation message on the channel of the first channel set or the second channel set, wherein the reservation message is configured to reserve a channel of the second channel set for transmission; the transmitting STA transmitting a data frame to the receiving STA on the reserved channel of the second channel set; and after receiving the data frame, the receiving STA transmitting acknowledgement information of the data frame on the channel of the first channel set or the second channel set.

If the result of the detection and/or the scanning satisfies the preset condition, the method further comprises: the transmitting STA performing receiving/transmission of a radio frame of a first type, which is different from the data frame, with the receiving STA on the channel of the first channel set.

The radio frame of the first type includes a management frame.

The step of the transmitting STA and the receiving STA reserving the channel of the second channel set for transmission comprises: the transmitting STA and the receiving STA exchanging the reservation message on the channel to be reserved of the second channel set, or the transmitting STA and the receiving STA exchanging the reservation message on the channel, which is overlapped with the channel to be reserved, of the first channel set; wherein the reservation message carries: occupancy time required for transmission on the channel to be reserved.

Before the transmitting STA and the receiving STA exchanging the reservation message, the method further comprises: the transmitting STA transmitting a radio frame, which is configured to reserve length of time required for transmitting one or more data frames, on the channel of the first channel set.

Before the transmitting STA transmitting the data frame to the receiving STA on the reserved channel of the second channel set, the method further comprises: the transmitting STA transmitting indication information to the receiving STA, wherein the indication information indicates at least one of: channel bandwidth to be reserved, and the channel set which the channel to be reserved belongs to.

The indication information is carried by a way of: carrying the information in the reservation message, or carrying the information via other message before transmitting the reservation message.

Whether the result of the detection and/or the scanning satisfies the preset condition is determined via steps of: determining whether the channel without interference exists in the first channel set and the second channel set, or, whether the channel of which value of interference signal is less than a preset threshold exists; and if yes, then determining that the result of the detection and/or the scanning satisfies the preset condition.

Before the transmitting STA transmitting the data frame to the receiving STA on the reserved channel of the second channel set, the method further comprises: the transmitting STA notifying the receiving STA of a transmission mode via a signaling, wherein the transmission mode comprises: the transmitting STA and the receiving STA exchanging the reservation message on the channel of the first channel set or the second channel set, and reserving the channel of the channel configured to be used for transmission; the transmitting STA and the receiving STA transmitting the data frame on the reserved channel; and after receiving the data frame, the receiving STA transmitting acknowledgement of the data frame on the channel of the first channel set or the second channel set.

The step of the transmitting STA notifying the receiving STA of the transmission mode via signaling comprises: the transmitting STA carrying information of frequency planning class, which the first channel set and the second channel set belong to, in a management frame transmitted on the channel of the first channel set.

Channel bandwidth formed by channels of the first channel set comprises: 20 MHz, 40 MHz, and 80 MHz; and channel bandwidth formed by channels of the second channel set comprises: 20 MHz, 40 MHz, 80 MHz, and 120 MHz.

The first channel set and the second channel set are channel sets formed by adopting different channelization methods for a same frequency band, wherein a center frequency point of the channel of the first channel set is different from a center frequency point of the channel of the second channel set, and the channel of the first channel set and the channel of the second channel set are fully or partly overlapped.

In order to achieve the purpose, according to another aspect, the disclosure provides a transmission device in the WLAN, which is arranged in a transmission device, wherein the transmission device includes: a detection unit, configured to perform channel detection and/or channel scanning for a channel of a first channel set and/or a second channel set; a reservation unit, configured to exchange a reservation message with a receiving Station (STA) on the channel of the first channel set or the second channel set, when result of the detection and/or the scanning satisfies a preset condition, wherein the reservation message is configured to reserve a channel of the second channel set for transmission; and a transmission unit, configured to transmit a data frame to the receiving STA on the reserved channel of the second channel set, and to receive acknowledgement information of the data frame transmitted from the receiving STA.

The reservation unit comprises: a first reservation module, configured to exchange the reservation message with the receiving STA on the channel to be reserved of the second channel set, or exchange the reservation message with the receiving STA on the channel, which is overlapped with the channel to be reserved, in the first channel set, wherein the reservation message carries: occupancy time required for transmission on the channel to be reserved.

The reservation unit comprises: a second reservation module, configured to before exchanging the reservation message with the receiving STA, transmit a radio frame, which is configured to reserve length of time required for transmitting one or more data frames, on the channel of the first channel set.

The transmission unit comprises: a first transmission module, configured to when the result of the detection and/or the scanning satisfies the preset condition, perform receiving/transmission of a radio frame of a first type, which is different from the data frame, with the receiving STA on the channel of the first channel set.

The transmission unit further comprises: a second transmission module, configured to before transmitting the data frame to the receiving STA on the reserved channel of the second channel set, transmit indication information to the receiving STA, wherein the indication information indicates at least one of: channel bandwidth to be reserved, and the channel set which the channel to be reserved belongs to.

The device further comprises: a determination unit, configured to determine whether the result of the detection and/or the scanning satisfies the preset condition via steps of: determining whether the channel without interference exists in the first channel set and the second channel set, or, whether the channel of which value of interference signal is less than a preset threshold exists; and if yes, then determining that the result of the detection and/or the scanning satisfies the preset condition.

In the disclosure, the transmitting STA or the receiving STA performs channel detection for the first channel set and/or the second channel set, so as to determine whether the channel of the second channel set can be used for transmission currently. Hence, the STAs which support the second channel set can transmit data frames on the second channel set. The transmission flexibility is improved. Meanwhile, the STAs which support the second channel set and the STAs which only support the first channel set can work together in the wireless network, so that the system has excellent backward compatibility.

Other features and advantages of the disclosure are described in the following instructions, and partly become obvious in the instructions, or can be understood by performing the disclosure. The purposes and other advantages of the disclosure can be realized and obtained via the structures which are particularly pointed out in the written descriptions, claims and drawings.

BRIEF DESCRIPTION OF THE DRAWINGS

The drawings described herein are used for further understanding the disclosure, and form a part of the application. The schematic embodiments of the disclosure and the specifications thereof are used for explaining the disclosure, and do not constitute improper limitation to the disclosure. In the drawings.

DETAILED DESCRIPTION OF THE EMBODIMENTS

The disclosure is described below in detail with reference to the drawings and embodiments. It should be noted that the embodiments in the application and the features of the embodiments can be combined with each other if there is no conflict.

In the embodiments of the disclosure, the two channel sets formed by adopting two channelization methods in the 5.725 GHz to 5.850 GHz frequency band are taken as the example for description. The first channel set starts the center frequency point from 5.745 GHz and is divided on the basis that each channel bandwidth is 20 MHz. Five 20 MHz channels which are non-overlapping with each other are formed in this frequency band, and the maximum channel bandwidth is 80 MHz. The second channel set is to shift each of the center frequency points for 7.5 MHz towards the direction of low frequency point, so that six 20 MHz channels which are non-overlapping with each other are generated, and the maximum channel bandwidth is 120 MHz (as shown in FIG. 2). The transmitting STA and the receiving STA can be one of the following: the AP and the non-access STA. The embodiments of the disclosure are described by taking the transmitting STA as the AP and the receiving STA as the non-access STA as an example.

Embodiment 1

Figure 3:
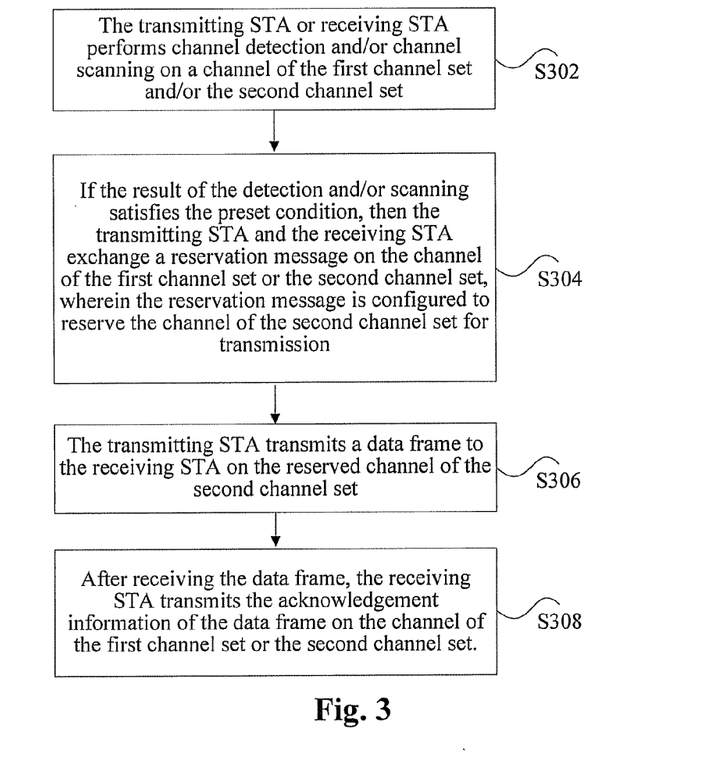
FIG. 3 shows a preferred flowchart of a transmission method in WLAN according to the embodiment of the disclosure.

FIG. 3 shows a preferred flowchart of a transmission method in WLAN according to the embodiment of the disclosure, including the following steps.

S302: the transmitting STA or the receiving STA performs channel detection and/or channel scanning on a channel of the first channel set and/or the second channel set.

S304: if the result of the detection and/or scanning satisfies the preset condition, then the transmitting STA and the receiving STA exchange a reservation message on the channel of the first channel set or the second channel set, wherein the reservation message is configured to reserve the channel of the second channel set for transmission.

S306: the transmitting STA transmits a data frame to the receiving STA on the reserved channel of the second channel set.

S308: after receiving the data frame, the receiving STA transmits the acknowledgement information of the data frame on the channel of the first channel set or the second channel set.

In the preferred embodiment, by performing channel detection and/or channel scanning for the first channel set and/or the second channel set, whether the channel of the second channel set can be used for transmitting the data frame can be determined. Then, the STAs which support the second channel set and the STAs which only support the first channel set can work together in the wireless network, and the system can obtain excellent backward compatibility.

Preferably, if the result of the detection and/or scanning satisfies the preset condition, the transmission method in the WLAN according to the embodiment of the disclosure further includes that: the transmitting STA performs receiving/transmission of the radio frame of the first type, which is different from the data frame, with the receiving STA on the channel of the first channel set. Preferably, the radio frame of the first type includes the management frame. In this preferred embodiment, by receiving/transmitting other types of radio frames on the channel of the first channel set, the transmission flexibility of the system can be increased. And, it is convenient for different STAs to perform receiving.

Preferably, the step that the transmission device and the receiving device reserve the channel of the second channel set for transmission includes that: the transmitting STA and the receiving STA exchange the reservation message on the channel to be reserved of the second channel set, or the transmitting STA and the receiving STA exchange the reservation message on the channel, which is overlapped with the channel to be reserved, in the first channel set. In this case, the reservation message carries: the occupancy time required for transmission on the channel to be reserved. In this preferred embodiment, by reserving the occupancy time of the channel required for transmission, other STAs cannot use the reserved channels to perform transmission in this time period, thus reducing the collision and guaranteeing the data transmission reliability.

Preferably, before the transmitting STA and the receiving STA exchange the reservation message, the transmission method in the WLAN according to the embodiment of the disclosure also includes that: the transmitting STA transmits a radio frame, which is configured to reserve the length of time required for transmitting one or more data frames, on the channel of the first channel set. In this preferred embodiment, both the transmitting party and receiving party can transmit a plurality of data frames in a reserved time period by reserving the length of time, so as to increase the utilization rate and flexibility of the system resource.

Preferably, before the transmitting STA transmits the data frame to the receiving STA on the reserved channel of the second channel set, the transmission method in the WLAN according to the embodiment of the disclosure also includes that: the transmitting STA transmits indication information to the receiving STA, wherein the indication information indicates at least one of the following contents: the channel bandwidth to be reserved, and the channel set which the channel to be reserved belongs to. In this preferred embodiment, the receiving STA can learn the related channel parameters for receiving the information via the indication information, so as to accurately receive the information.

Preferably, the indication information is carried by adopting the following modes: carrying the information in the reservation message, or carrying the information via other messages before transmitting the reservation message. In this preferred embodiment, the indication information can be carried via different messages, so as to increase the flexibility of the method.

Preferably, based on the above preferred embodiments, whether the result of the detection and/or scanning satisfies the preset condition can be determined via the following steps: determining whether a channel without interference exists in the first channel set and the second channel set, or, whether a channel of which the value of interference signal is less than the preset threshold exists; and if such channel exists, then determining that the result of the detection and/or scanning satisfies the preset condition. In this preferred embodiment, the result of the detection and/or scanning can be accurately determined via the determination steps.

Preferably, based on each of the preferred embodiments, before the transmitting STA transmits the data frame to the receiving STA on the reserved channel of the second channel set, the method further includes that: the transmitting STA notifies the receiving STA of the transmission mode via signaling, wherein the transmission mode includes that: the transmitting STA and the receiving STA exchange the reservation message on the channel of the first channel set or the second channel set, and reserve a channel of a channel set for transmission; the transmitting STA and the receiving STA transmit data frame on the reserved channel; and after receiving the data frame, the receiving STA transmits acknowledgement of the data frame on the channel of the first channel set or the second channel set. In this preferred embodiment, both communication parties can learn the mode of the transmission via way of notification. Both communication parties can prepare for the transmission in advance, thus guaranteeing the accuracy of transmitting and receiving the data.

Preferably, the step that the transmitting STA notifies the receiving STA of the transmission mode via signaling includes that: the transmitting STA carries the information of frequency planning class, which the first channel set and the second channel set belong to, in the management frame transmitted on the channel of the first channel set. In this preferred embodiment, the receiving STA can learn the frequency planning class of the first channel set and the second channel set via way of notification. Thus, the transmission mode and the used channels can be determined, so that the accuracy of receiving the data can be guaranteed.

Preferably, the channel bandwidth formed by the channels of the first channel set includes: 20 MHz, 40 MHz, and 80 MHz. The channel bandwidth formed by the channels of the second channel set includes: 20 MHz, 40 MHz, 80 MHz, and 120 MHz. In this preferred embodiment, the limited channel bandwidth satisfies the evolution standard of the WLAN, and achieves the purpose of backward compatibility.

Preferably, the first channel set and the second channel set are channel sets formed by adopting different channelization methods for the same frequency band, wherein the center frequency points of the channels of the first channel set are different from the center frequency points of the channels of the second channel set, and the channels of the first channel set and the channels of the second channel set are fully or partly overlapped. In this preferred embodiment, the generation mode of the limited channel set satisfies the requirements of the WLAN standard.

Embodiment 2

This embodiment describes an application method of using the first channel set and the second channel set to transmit the frame switching sequence. The frame switching sequence includes the data frame, and the control frame related to the data transmission, such as the Channel Reservation Request/Response frame (RTS/CTS), acknowledgement (ACK) frame of the data, and the like. All the frames form the sequence according to the receiving/transmission timing relationships.

The AP supports to work in the first channel set and the second channel set. STAs of different capacities are associated under the AP. For example, if there are the 802.11n STA which only supports to work on the first channel set, the 802.11ac STA which does not support the second channel set, and the 802.11ac STA which supports the first and second channel sets, then when the AP works in 20/40/80 MHz, the AP and STA exchange the RTS/CTS on the channel of the first channel set, so as to transmit the data frame and the ACK frame. The control frame refers to a frame which controls the data receiving/transmission, including at least one of: RTS, CTS, ACK frame, Poll Frame (PS-Poll), Competition period end frame (CF-END, CF-End+CF-Ack), Block ACK Request frame and Block ACK frame. In addition, the AP and STA also transmit the management frame on the channel of the first channel set. The management frame refers to the frame used for BBS management. The management frame related to the access process includes at least one of the following: a Beacon frame, an Associated Request frame, an Association Response is frame, a Reassociation Request frame, a Reassociation Response frame, a Disassociation frame, a Probe Request frame, a Probe Response frame, an Authentication frame, a Deauthentication frame, and part of the Action frames. The data frame refers to the frame used for transmitting data.

The AP, or the non-AP STA associated to the AP, performs channel scanning and/or channel detection for the five 20 MHz basic channels of the first channel set, or performs channel scanning and/or channel detection for the six 20 MHz basic channels of the second channel set. When detecting that the interference of the five 20 MHz basic channels of the first channel set or that of the six 20 MHz basic channels of the second channel set is less than the preset threshold, or determining that the second channel set has no interference according to the scanning result, it is determined that the channels of the second channel set are available. Then, the 120 MHz channels of the second channel set are adopted to transmit the data frame.

Before adopting the 120 MHz channels of the second channel set to transmit the data frame, the AP needs to perform channel reservation. The specific method includes: interacting RTS/CTS frames on the five 20 MHz channels of the first channel set. The AP transmits the RTS to the STA on the five 20 MHz channels of the first channel set. The STA obtains the information of starting to transmit the data frame on the 120 MHz channels of the second channel set by detecting the preamble of the RTS frame on the five 20 MHz channels of the first channel set. Then, the STA answers the CTS (at least including the main channel) on the channel of the first channel set, wherein this channel of the first channel set is the channel from which the STA received the RTS, and the STA detects this channel to be idle. In this embodiment, if all the five 20 MHz channels of the first channel set are detected to be idle, then the CTS is answered on all of them, thus completing the reservation of the 120 MHz transmission. In addition, the AP also can transmit the indication information to the STA to indicate at least one of the following contents: the channel bandwidth to be reserved (120 MHz in this embodiment), and the channel set (the second channel set in this embodiment) which the channel to be reserved belongs to. The above indication information can be transmitted by carrying it in the RTS frame. After completing interaction of RTS/CTS, the AP and the STA transmit the 120 MHz data frames on the channels of the second channel set, and transmit the ACK frame of the data frames. In this case, the ACK frame can be transmitted to the AP on the five 20 MHz channels of the first channel set, or can be transmitted to the AP only on the main channel of the first channel set, or can be transmitted to the AP by the second channel set with the 120 MHz bandwidth.

Alternatively, before transmitting the data frame by the 120 MHz channels of the second channel set and before transmitting the RTS/CTS frame, the AP carries the indication information via other messages to indicate at least one of the following contents: the channel bandwidth to be reserved (120 MHz in this embodiment), and the channel set (the second channel set in this embodiment) which the channel to be reserved belongs to. For example, a setting frame which contains the indication information can be transmitted. Then, the "CTS to self" frame is transmitted on the five 20 MHz channels of the first channel set, and the length of time to be occupied on the channel of the second channel set is reserved. And then, the AP and the STA exchange the RTS/CTS frame on the five 20 MHz channels of the first channel set, transmit the 120 MHz data frame on the channel of the second channel set, and transmit the ACK frame of the data frame. In this case, the ACK frame can be transmitted to the AP on the five 20 MHz channels of the first channel set, or can be transmitted to the AP on the main channel, or can be transmitted to the AP on the second channel set with 120 MHz bandwidth. Here, the length of time occupied by the channel which is reserved by the "CTS to self" frame may include the transmission time of multiple data frames, namely, the time required for transmitting a plurality of RTS/CTS frames, data frames and ACK frames between the AP and STA.

Via the above indication method, the AP and STA learn to begin to transmit the data frame on the 120 MHz channels of the second channel set. And, via the above channel reservation method, the occupancy time of the channel is reserved for the 120 MHz transmission to be performed, so that other STAs cannot use the channels to perform transmission in the time period.

When the data frame is transmitted on the 120 MHz large bandwidth channel of the second channel set, the control frame is transmitted on the first channel set, so as to guarantee that all other STAs can receive and analyze the control frame. Thus, this solution achieves the purpose of channel reservation. The management frame related to the access process is transmitted on the first channel set, so as to guarantee that the STAs which only support the first channel set can access the AP. The AP can be compatible with various STAs working under different channel sets via the above working mode.

Embodiment 3

This embodiment describes an application method of performing frame switching sequence transmission in the form of 120 MHz by adopting the second channel set. And specifically, the data frame and the control frame are transmitted using the second channel set.

The AP supports to work on the first channel set and the second channel set, and STAs of different capacities are associated under the AP. For example, there are the 802.11n STA which only supports to work on the first channel set, the 802.11ac STA which does not support the second channel set, and the 802.11ac STA which supports the first and second channel sets. When the AP works in 20/40/80 MHz, the AP transmits the control frame, and the management frame and the date frame related to the access process on the channel of the first channel set.

The AP, or the non-AP STA associated to the AP, performs channel scanning and/or channel detection for the five 20 MHz basic channels of the first channel set, or performs channel scanning and/or channel detection for the six 20 MHz basic channels of the second channel set. When detecting that the interference of the five 20 MHz basic channels of the first channel set or that of the six 20 MHz basic channels of the second channel set is less than the preset threshold, or determining that the second channel set has no interference according to the scanning result, it is determined that the channels of the second channel set are available. The 120 MHz channels of the second channel set are adopted to transmit the frame switching sequence. In addition, the management frame related to the access process is transmitted on the first channel set, so as to guarantee that the STAs which support the first channel set can access the AP.

Before adopting the 120 MHz channels of the second channel set to transmit, the AP first transmits the indication information to the STA to indicate at least one of: the channel bandwidth to be reserved (120 MHz in this embodiment), and the channel set (the second channel set in this embodiment) which the channel to be reserved belongs to. For example, a setting frame which contains the indication information is transmitted. Then the "CTS to self" frame is transmitted on the five 20 MHz channels of the first channel set, and the length of time to be occupied on the channel of the second channel set is reserved. And then, the RTS/CTS frames are exchanged on the six 20 MHz channels of the second channel set, the 120 MHz data frame is transmitted on the channel of the second channel set, and the ACK frame of the data frame is transmitted on the second channel set.

Via the above indication method, the AP and the STA learn that the data frame is to be transmitted on the 120 MHz channels. Via the above channel reservation method, the occupancy time of the channel is reserved for the 120 MHz transmission to be performed, so that other STAs cannot use the channels to transmit in the time period. Via the above working mode, the AP can be compatible with various STAs which work under different channel sets.

Embodiment 4

The AP supports to work on the first channel set and the second channel set, and STAs of different capacities are associated under the AP. For example, there are the 802.11n STA which only supports to work on the first channel set, the 802.11ac STA which does not support the second channel set, and the 802.11ac STA which supports the first and second channel sets. Then, the AP adopts the following mode to operate:

when the AP works in 20/40/80 MHz, the AP transmits the control frame, the management frame and the date frame on the channel of the first channel set; and meanwhile, the AP, or the STA associated to the AP, performs scanning/detection for the channels of the second channel set, and adopts the channels of the second channel set to transmit the data frame after determining that the channels of the second channel set are available.

Figure 4:
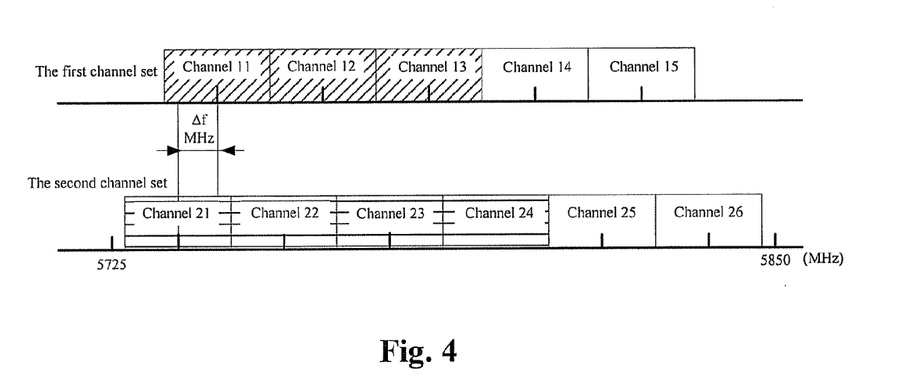
FIG. 4 shows a diagram of detected and/or scanned channel sets according to the embodiment of the disclosure.

As shown in FIG. 4, the AP performs channel scanning and/or channel detection for the channel 11, the channel 12 and the channel 13 of the first channel set, or performs channel scanning and/or channel detection for the channel 21, the channel 22, the channel 23 and the channel 24 of the second channel set. When detecting that the interference of the 3 20 MHz basic channels of the first channel set and that of the 4 20 MHz basic channels of the second channel set are less than the preset threshold, or determining that the second channel set has no interference according to the scanning result, determining that the channels of the second channel set are available, and adopting the 80 MHz large bandwidth channel composed of the 4 20 MHz channels of the second channel configured to transmit the data frame. Here, by performing scanning and/or detection for the 3 channels which are overlapped with the 4 channels in the second channel set of the first channel set, it can determine whether the above channels of the second channel set can be used.

Before transmitting the data frame by adopting the 80 MHz channel of the second channel set, the AP needs to reserve the channel. The specific method includes: exchanging the RTS/CTS frames on the channel 11, the channel 12 and the channel 13 of the first channel set, or transmitting the "CTS to self" frame. Via the above channel reservation method, the channel occupancy time is reserved for the 80 MHz transmission to be performed, so that other STAs cannot use the channels to perform transmission in this time period. Via the above channel reservation, both the AP and the STA can learn that the data frame is to be transmitted in 80 MHz, and the AP also can notify the STA that the data frame is to be transmitted on 80 MHz channel of the second channel set via the way of sending signaling.

When the data frame is transmitted on the 80 MHz large bandwidth channel of the second channel set, the control frame and the management frame related to the access process are still transmitted on the first channel set.

Via the above working mode, the AP can be compatible with various STAs working under different channel sets, and can make full use of the non-disturbed channels of the plurality of channel sets to perform transmission.

Embodiment 5

The AP supports to work on the first channel set and the second channel set, and STAs of different capacities are associated under the AP. For example, there are the 802.11n STA which only supports to work on the first channel set, the 802.11ac STA which does not support the second channel set, and the 802.11ac STA which supports the first and second channel sets. Then the AP adopts the following mode to operate:

when the AP works in 20/40/80 MHz, the AP transmits the control frame, the management frame and the date frame on the channel of the first channel set; and meanwhile, the AP, or the STA associated to the AP, performs scanning/detection for the channels of the second channel set, and adopts the channels of the second channel set to transmit the frame switching sequence after determining that the channels of the second channel set are available.

The AP performs channel scanning and/or channel detection for the channel 11, the channel 12 and the channel 13 of the first channel set, or performs channel scanning and/or channel detection for the channel 21, the channel 22, the channel 23 and the channel 24 of the second channel set. When detecting that the interference of the three 20 MHz basic channels of the first channel set and that of the four 20 MHz basic channels of the second channel set are less than the preset threshold, or determining that the second channel set has no interference according to the scanning result, it is determined that the channels of the second channel set are available. And, the 80 MHz channels of the second channel set are adopted to transmit the frame switching sequence. Similar with embodiment 3, by performing scanning and/or detection for the three channels of the first channel set, which are overlapped with the four channels in the second channel set, it can determine whether the above channels of the second channel set can be used.

Before adopting the 80 MHz channels of the second channel set to transmit, the AP needs to reserve the channel. The specific method includes: first transmitting the indication information to the STA to indicate at least one of: the channel bandwidth to be reserved (80 MHz in this embodiment), and the channel set (the second channel set in this embodiment) which the channel to be reserved belongs to; for example, transmitting a setting frame which contains the indication information; then transmitting the "CTS to self" frame on the three 20 Mhz channels of the first channel set, and reserving the length of time to be occupied on the channel of the second channel set; and then, exchanging the RTS/CTS frames on the four 20 MHz channels of the second channel set, transmitting the 80 MHz data frame on the channels of the second channel set, and transmitting the ACK frame of the data frame on the second channel set.

When the data frame and the related control frame are transmitted on the 80 MHz large bandwidth channel of the second channel set, the management frame related to the access process is still transmitted on the first channel set. Via the above working mode, the AP can be compatible with various STAs which work under different channel sets.

Embodiment 6

The embodiment is an example that a device notifies to perform transmission by adopting the modes described in the disclosure.

In the specific implementation process, the notification mode can be transmitting the management frame on the channel of the first channel set. For example, the beacon frame and the probe_response frame carry the frequency panning class which supports the two channel sets. Table 1 shows such an example.

TABLE 1

Identification number of channel planning class

| Identification number of channel planning class | Starting frequency point (GHz) | Channel spacing (MHz) | Channel set |
|---|---|---|---|
| 1 | 5 | 20 | 149, 153, 157, 161, 165 |
| 2 | 5 | 40 | 149, 157 |
| 3 | 5 | 80 | 149 |
| 4 | 4.9925 | 20 | 149, 153, 157, 161, 165, 169 |
| 5 | 4.9925 | 40 | 149, 157, 165 |
| 6 | 4.9925 | 80 | 149 |
| 7 | 4.9925 | 120 | 149 |
| 8 | 4.9925 | 80 | 157 |
| ... | | | |

Embodiment 7

Figure 5:
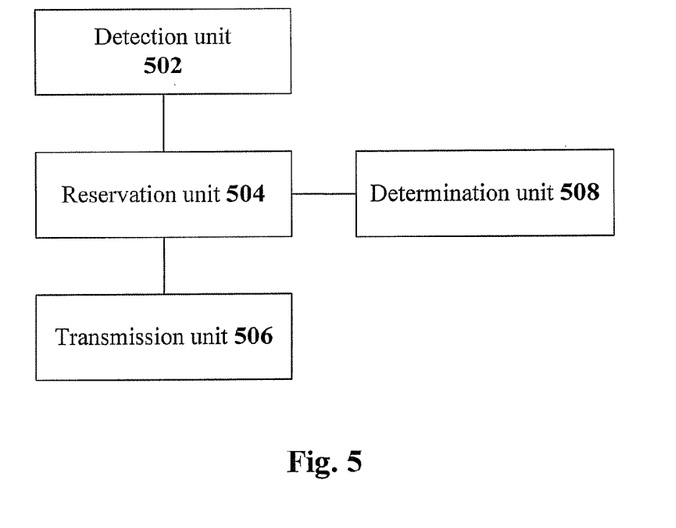
FIG. 5 shows a preferred structure diagram of a transmission device in WLAN according to the embodiment of the disclosure.

FIG. 5 shows a preferred structure diagram of a transmission device in WLAN according to the embodiment of the disclosure. As shown in FIG. 5, the transmission device is arranged in the receiving device, wherein the transmission device includes: a detection unit 502, configured to perform channel detection and/or channel scanning for the channels of the first channel set and/or the second channel set; a reservation unit 504, connected with the detection unit 502, and configured to exchange the reservation message with the receiving STA on the channel of the first channel set or the second channel set when the result of the detection and/or scanning satisfies the preset condition, wherein the reservation message is configured to reserve the channel of the second channel set for transmission; a transmission unit 506, connected with the reservation unit 504, and configured to transmit the data frame to the receiving STA on the reserved channel of the second channel set, and to receive the acknowledgement information of the data frame transmitted from the receiving STA.

In the preferred embodiment, by performing channel scanning and/or channel detection for the first channel set and the second channel set, and determining whether the channels of the second channel set can be used for transmission, the STA which supports the second channel set can transmit the data frame on the second channel set, thus increasing the transmission flexibility. Meanwhile, the STA which supports the second channel set and the STA which only supports the first channel set can work together in the wireless network. Thus, the system can have excellent backward compatibility.

Preferably, the reservation unit 504 in the WLAN is configured to reserve the time occupied by the channel of the second channel set with the receiving STA before performing transmission with the receiving STA on the channel of the second channel set.

Figure 6:
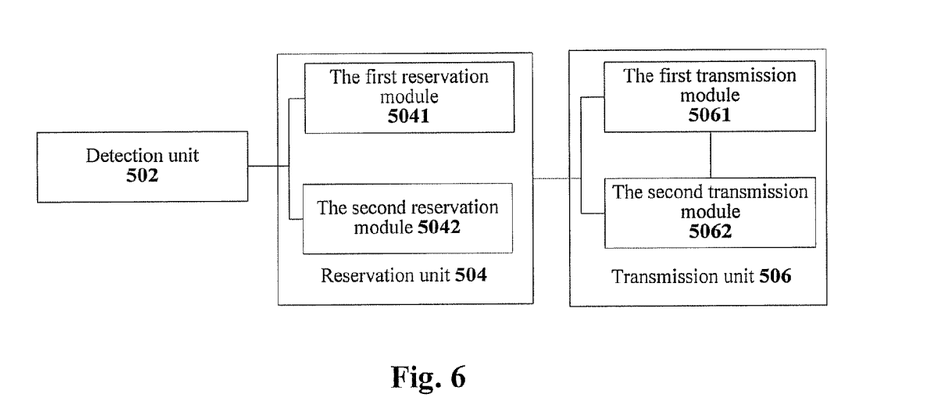
FIG. 6 shows another preferred structure diagram of a transmission device in WLAN according to the embodiment of the disclosure.

Preferably, as shown in FIG. 6, the reservation unit 504 includes: the first reservation module 5041, configured to exchange the reservation message with the receiving STA on the channel to be reserved of the second channel set, or exchange the reservation message with the receiving STA on the channel, which is overlapped with the channel to be reserved, in the first channel set, wherein the reservation message carries: the occupancy time required for transmission on the channel to be reserved. In this preferred embodiment, by reserving the occupancy time required for transmission of the channel, other STAs cannot use the reserved channels to perform transmission in this time period, thus reducing the collision, and guaranteeing the reliability of data transmission.

Preferably, the reservation unit 504 includes: the second reservation module 5042, configured to transmit the radio frame, which is configured to reserve the length of time required for transmitting one or more data frames, on the channel of the first channel set before exchanging the reservation message with the receiving STA. In this preferred embodiment, by reserving the length of time, both the receiving party and the transmitting party can transmit a plurality of data frames in a reserved time period, thus increasing the utilization rate and flexibility of the system resource.

Preferably, the transmission unit 506 includes: the first transmission module 5061, configured to perform receiving/transmission of the radio frame of the first type, which are different from the data frame, with the receiving STA on the channel of the first channel set, when the result of the detection and/or scanning satisfies the preset condition. In this preferred embodiment, by receiving/transmitting other types of radio frames on the channels of the first channel set, the transmission flexibility of the system is increased, and it is convenient for different STAs to perform receiving.

Preferably, the first type of radio frame includes: the management frame, or the control frame and the management frame. In this preferred embodiment, if the first type of the radio frame is the management frame, then the frames transmitted on the reserved channel of the second channel set are the control frame and the data frame.

Preferably, the transmission unit 506 also includes: the second transmission module 5062, configured to transmit the indication information to the receiving STA, before transmitting the data frame to the receiving STA on the reserved channel of the second channel set, wherein the indication information indicates at least one of: the channel bandwidth to be reserved, and the channel set which the channel to be reserved belongs to. In this preferred embodiment, the receiving STA can learn the related channel parameters for receiving information via the indication information. Thus, the receiving STA can correctly receive information.

Preferably, the indication information is carried by adopting the following modes: carrying it in the reservation message, or carrying it via other messages before the reservation message is transmitted. In this preferred embodiment, the above indication information is carried via different messages, thus increasing the flexibility of the disclosure.

Preferably, the transmission device in the WLAN according to the embodiment of the disclosure also includes: a determination unit 508, configured to determine whether the result of the detection and/or scanning satisfies the preset condition via the following steps: determining whether the channel without interference exists in the first channel set or the second channel set, or whether the channel of which the value of the interference signal is less than the preset threshold exists; and if such channel exists, then determining that the result of the detection and/or scanning satisfies the preset condition. In this preferred embodiment, the result of the detection and/or scanning can be correctly determined via the above steps.

Preferably, based on the above preferred embodiments, before transmitting the data frame to the receiving STA on the reserved channel of the second channel set, the transmission unit 506 is further configured to notify the receiving STA of the transmission mode via signaling, wherein the transmission mode includes that: the transmission device and the receiving STA exchange the reservation message on the channel of the first channel set or the second channel set, and reserve the channel of the channel set for transmission; the transmission device and the receiving STA transmit the data frame on the reserved channel; and after receiving the data frame, the receiving STA transmits the acknowledgement of the data frame on the channel of the first channel set or the second channel set. In this preferred embodiment, both communication parties can learn the mode of transmission via the way of notification. Both communication parties can prepare to transmit in advance, thus guaranteeing the accuracy of transmitting and receiving data.

Preferably, the step that the transmission unit 506 notifies the receiving STA of the transmission mode via signaling includes that: the transmission unit 506 carries the information of frequency planning class, which the first channel set and the second channel set belong to, in the management frame which is transmitted on the channel of the first channel set. In this preferred embodiment, the receiving STA can learn the frequency planning class of the first channel set and the second channel set via the way of notification. The transmission mode and the used channels are determined, and thus guaranteeing the accuracy of receiving data.

Preferably, the channel bandwidth formed by the channels of the first channel set includes: 20 MHz, 40 MHz, and 80 MHz. The channel bandwidth formed by the channels of the second channel set includes: 20 MHz, 40 MHz, 80 MHz, and 120 MHz. In this preferred embodiment, the limited channel bandwidth satisfies the evolution standard of the WLAN, thus achieving the purpose of backward compatibility.

Preferably, the first channel set and the second channel set are the channel sets formed by adopting different channelization methods for the same frequency band. The center frequency points of the channels of the first channel set are different from the center frequency points of the channels of the second channel set, and the channels of the first channel set and the channels of the second channel set are fully or partly overlapped. In this preferred embodiment, the generation mode of the limited channel sets can satisfy the requirements of the WLAN standard.

It should be noted that the steps shown in the flowchart of the drawings can be executed in a computer system, for example, a group of computers which can execute the instructions. In addition, although the logical sequence is shown in the flowchart, the shown or described steps can be executed according to different sequences in some cases.

Obviously, those skilled in the art should understand that each module or each step of the disclosure can be performed via the universal calculating devices. They can be centralized on a single calculating device, or distributed on the network to composed of a plurality of calculating devices. Selectively, they can be performed by the program codes capable of being executed by the calculating devices. Thus, they can be stored in a storage device to be executed by the calculating device. And in some cases, the steps which are shown or described can be executed according to different sequences; or they can be respectively manufactured as each integrated circuit module, or multiple modules or steps thereof can be manufactured as single integrated circuit modules to be performed. Thereby, the disclosure is not limited to the any specific combination of hardware and software.

The above are only the preferred embodiments of the disclosure and are not intended to limit the disclosure. For those skilled in the art, the disclosure can have various modifications and changes. Any modifications, equivalent replacements, improvements and the like within the principle of the disclosure shall fall within the scope of protection of the disclosure.

What is claimed is:

1. A transmission method in Wireless Local Area Network (WLAN), comprising:
    a transmitting Station (STA) or a receiving STA performing channel detection on a channel of a first channel set; or, a transmitting STA or a receiving STA performing channel detection on a channel of a second channel set; or, a transmitting STA or a receiving STA performing channel detection on a channel of a first channel set and a second channel set; or, a transmitting STA or a receiving STA performing channel scanning on a channel of a first channel set; or, a transmitting STA or a receiving STA performing channel scanning on a channel of a second channel set; or, a transmitting STA or a receiving STA performing channel scanning on a channel of a first channel set and a second channel set; or, a transmitting STA or a receiving STA performing channel detection and channel scanning on a channel of a first channel set; or, a transmitting STA or a receiving STA performing channel detection and channel scanning on a channel of a second channel set or, a transmitting STA or a receiving STA performing channel detection and channel scanning on a channel of a first channel set and a second channel set,
    if result of the detection satisfies a preset condition, or, if result of the scanning satisfies a preset condition, or, if result of the detection and the scanning satisfies a preset condition, then the transmitting STA and the receiving STA exchanging a reservation message on the channel of the first channel set or the second channel set, wherein the reservation message is configured to reserve a channel of the second channel set for transmission;
    the transmitting STA transmitting a data frame to the receiving STA on the reserved channel of the second channel set; and
    after receiving the data frame, the receiving STA transmitting acknowledgement information of the data frame on the channel of the first channel set or the second channel set;
    wherein the step of the transmitting STA and the receiving STA reserving the channel of the second channel set for transmission comprises: the transmitting STA and the receiving STA exchanging the reservation message on the channel to be reserved of the second channel set, or the transmitting STA and the receiving STA exchanging the reservation message on the channel, which is overlapped with the channel to be reserved, of the first channel set; wherein the reservation message carries: occupancy time required for transmission on the channel to be reserved.

2. The method according to claim 1, wherein if result of the detection satisfies a preset condition, or, if result of the scanning satisfies a preset condition, or, if result of the detection and the scanning satisfies a preset condition, the method further comprises:
    the transmitting STA performing receiving or transmission of a radio frame of a first type, which is different from the data frame, with the receiving STA on the channel of the first channel set.

3. The method according to claim 2, wherein the radio frame of the first type comprises a management frame.

4. The method according to claim 1, wherein before the transmitting STA and the receiving STA exchanging the reservation message, the method further comprises:
    the transmitting STA transmitting a radio frame, which is configured to reserve length of time required for transmitting one or more data frames, on the channel of the first channel set.

5. The method according to claim 1, wherein before the transmitting STA transmitting the data frame to the receiving STA on the reserved channel of the second channel set, the method further comprises:
    the transmitting STA transmitting indication information to the receiving STA, wherein the indication information indicates at least one of: channel bandwidth to be reserved, and the channel set which the channel to be reserved belongs to.

6. The method according to claim 5, wherein the indication information is carried by a way of: carrying the indication information in the reservation message, or carrying the indication information via other message before transmitting the reservation message.

7. The method according to claim 1, wherein whether the result of the detection satisfies the preset condition, or, the result of the scanning satisfies the preset condition, or, the result of the detection and the scanning satisfies the preset condition is determined via steps of:
    determining whether the channel without interference exists in the first channel set and the second channel set, or, whether the channel of which value of interference signal is less than a preset threshold exists; and
    if yes, then determining that the result of the detection satisfies the preset condition, or, the result of the scanning satisfies the preset condition; or, the result of the detection and the scanning satisfies the preset condition.

8. The method according to claim 1, wherein before the transmitting STA transmitting the data frame to the receiving STA on the reserved channel of the second channel set, the method further comprises:
    the transmitting STA notifying the receiving STA of a transmission mode via a signaling, wherein the transmission mode comprises: the transmitting STA and the receiving STA exchanging the reservation message on the channel of the first channel set or the second channel set, and reserving the channel of the channel configured to be used for transmission; the transmitting STA and the receiving STA transmitting the data frame on the reserved channel; and
    after receiving the data frame, the receiving STA transmitting acknowledgement of the data frame on the channel of the first channel set or the second channel set.

9. The method according to claim 8, wherein the step of the transmitting STA notifying the receiving STA of the transmission mode via signaling comprises:
    the transmitting STA carrying information of frequency planning class, which the first channel set and the second channel set belong to, in a management frame transmitted on the channel of the first channel set.

10. The method according to claim 1, wherein channel bandwidth formed by channels of the first channel set comprises: 20 MHz, 40 MHz, and 80 MHz; and channel bandwidth formed by channels of the second channel set comprises: 20 MHz, 40 MHz, 80 MHz, and 120 MHz.

11. The method according to claim 1, wherein the first channel set and the second channel set are channel sets formed by adopting different channelization methods for a same frequency band, wherein a center frequency point of the channel of the first channel set is different from a center frequency point of the channel of the second channel set, and the channel of the first channel set and the channel of the second channel set are fully or partly overlapped.

12. A transmission device in Wireless Local Area Network (WLAN), which is arranged in a transmission device, comprising: a hardware processor and program units stored in a memory, and the hardware is configured to execute the program units, the program units comprising:
a detection unit, configured to perform channel detection on a channel of a first channel set; or, perform channel detection on a channel of a second channel set; or, perform channel detection on a channel of a first channel set and a second channel set; or, perform channel scanning on a channel of a first channel set; or, perform channel scanning on a channel of a second channel set; or, perform channel scanning on a channel of a first channel set and a second channel set; or, perform channel detection and channel scanning on a channel of a first channel set; or, perform channel detection and channel scanning on a channel of a second channel set; or, perform channel detection and channel scanning on a channel of a first channel set and a second channel;
a reservation unit, configured to exchange a reservation message with a receiving Station (STA) on the channel of the first channel set or the second channel set, when result of the detection satisfies a preset condition, or, when result of the scanning satisfies a preset condition, or, when result of the detection and the scanning satisfies a preset condition, wherein the reservation message is configured to reserve a channel of the second channel set for transmission; and
a transmission unit, configured to transmit a data frame to the receiving STA on the reserved channel of the second channel set, and to receive acknowledgement information of the data frame transmitted from the receiving STA;
wherein the reservation unit comprises: a first reservation module, configured to exchange the reservation message with the receiving STA on the channel to be reserved of the second channel set, or exchange the reservation message with the receiving STA on the channel, which is overlapped with the channel to be reserved, in the first channel set, wherein the reservation message carries: occupancy time required for transmission on the channel to be reserved.

13. The device according to claim 12, wherein the reservation unit comprises:
a second reservation module, configured to before exchanging the reservation message with the receiving STA, transmit a radio frame, which is configured to reserve length of time required for transmitting one or more data frames, on the channel of the first channel set.

14. The device according to claim 12, wherein the transmission unit comprises:
a first transmission module, configured to when the result of the detection satisfies the preset condition, or, when the result of the scanning satisfies the preset condition; or, when the result of the detection and the scanning satisfies the preset condition, perform receiving or transmission of a radio frame of a first type, which is different from the data frame, with the receiving STA on the channel of the first channel set.

15. The device according to claim 12, wherein the transmission unit further comprises:
a second transmission module, configured to before transmitting the data frame to the receiving STA on the reserved channel of the second channel set, transmit indication information to the receiving STA, wherein the indication information indicates at least one of: channel bandwidth to be reserved, and the channel set which the channel to be reserved belongs to.

16. The device according to claim 12, wherein the program units further comprises: a determination unit, configured to determine whether the result of the detection satisfies the preset condition, or, the result of the scanning satisfies the preset condition, or, the result of the detection and the scanning satisfies the preset condition via steps of:
determining whether the channel without interference exists in the first channel set and the second channel set, or, whether the channel of which value of interference signal is less than a preset threshold exists; and
if yes, then determining that the result of the detection satisfies the preset condition, or, the result of the scanning satisfies the preset condition; or, the result of the detection and the scanning satisfies the preset condition.

* * * * *